United States Patent
Xiao et al.

(10) Patent No.: US 9,771,514 B2
(45) Date of Patent: Sep. 26, 2017

(54) SEALANT, PREPARATION METHOD THEREOF, CURING METHOD, AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wenjun Xiao, Beijing (CN); Xiaochuan Chen, Beijing (CN); Wenbo Jiang, Beijing (CN); Shijun Wang, Beijing (CN); Lei Wang, Beijing (CN); Yanna Xue, Beijing (CN); Yue Li, Beijing (CN); Zhiying Bao, Beijing (CN); Zhenhua Lv, Beijing (CN); Yong Zhang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/084,942

(22) Filed: Mar. 30, 2016

(65) Prior Publication Data

US 2016/0304774 A1    Oct. 20, 2016

(30) Foreign Application Priority Data

Apr. 16, 2015    (CN) .......................... 2015 1 0181197

(51) Int. Cl.
*C09K 9/02*    (2006.01)
*G02F 1/15*    (2006.01)
(Continued)

(52) U.S. Cl.
CPC ................ *C09K 9/02* (2013.01); *G02F 1/157* (2013.01); *G02F 1/1521* (2013.01); *G02F 1/161* (2013.01);
(Continued)

(58) Field of Classification Search
CPC .... C09K 9/00; C09K 9/02; C09K 2211/1433; G02F 1/15; G02F 1/1521; G02F 1/153;
(Continued)

(56) References Cited

U.S. PATENT DOCUMENTS

| | | | | |
|---|---|---|---|---|
| 4,761,061 A | * | 8/1988 | Nishiyama | G02F 1/161 359/265 |
| 5,790,298 A | * | 8/1998 | Tonar | G02F 1/161 359/265 |
| 6,001,487 A | * | 12/1999 | Ladang | B32B 17/10045 428/344 |
| 6,157,480 A | * | 12/2000 | Anderson | G02F 1/161 359/265 |

(Continued)

FOREIGN PATENT DOCUMENTS

| CN | 103135310 A | 6/2013 |
|---|---|---|
| CN | 103305133 A | 9/2013 |

(Continued)

OTHER PUBLICATIONS

Chinese office action dated Mar. 3, 2017.

*Primary Examiner* — Loha Ben
(74) *Attorney, Agent, or Firm* — Dilworth & Barrese, LLP.; Michael J. Musella, Esq.

(57) ABSTRACT

A sealant, a preparation method and a curing method thereof, and a display apparatus are provided. The sealant includes a viscous transparent base material and electrochromic material doped in the base material. The electrochromic material is mutually linked to form a conductive chain and can change color in the case that an electric field is applied upon the electrochromic material, to prevent light from passing through.

18 Claims, 1 Drawing Sheet

(51) Int. Cl.
*G02F 1/161* (2006.01)
*G02F 1/157* (2006.01)
*G02B 5/20* (2006.01)
*G02B 5/22* (2006.01)

(52) U.S. Cl.
CPC ........ *C09K 2211/1433* (2013.01); *G02B 5/20* (2013.01); *G02B 5/208* (2013.01); *G02B 5/22* (2013.01); *G02F 1/15* (2013.01)

(58) Field of Classification Search
CPC G02F 1/157; G02F 1/161; G02B 5/20; G02B 5/206; G02B 5/208; G02B 5/22; G02B 5/23; F21V 9/04; F21V 9/06
USPC ........ 359/265, 273, 275; 252/500, 583, 586, 252/588, 589
See application file for complete search history.

(56) References Cited

U.S. PATENT DOCUMENTS

| | | | | |
|---|---|---|---|---|
| 6,195,193 | B1* | 2/2001 | Anderson | G02F 1/161 359/265 |
| 6,525,861 | B1* | 2/2003 | Roberts | G02F 1/1521 359/265 |
| 6,778,311 | B2* | 8/2004 | Roberts | G02F 1/1521 252/586 |
| 7,031,044 | B2* | 4/2006 | Roberts | G02F 1/1521 252/586 |
| 2016/0282695 | A1* | 9/2016 | Agrawal | B60R 1/088 |

FOREIGN PATENT DOCUMENTS

| | | |
|---|---|---|
| CN | 103305153 A | 9/2013 |
| JP | S5714823 A | 1/1982 |
| JP | S5758125 A | 4/1982 |

\* cited by examiner

SEALANT, PREPARATION METHOD THEREOF, CURING METHOD, AND DISPLAY APPARATUS

TECHNICAL FIELD

Embodiments of the present disclosure relate to a sealant, a preparation method thereof, a curing method, and a display apparatus.

BACKGROUND

A liquid crystal display apparatus comprises: a backlight module; an array substrate and a color substrate which are disposed oppositely; a liquid crystal molecule layer located between the array substrate and the color substrate; and a sealant, wherein the sealant is used for adhering the array substrate with the color substrate and protecting the liquid crystal molecules therebetween from ambient air and water.

A conventional sealant comprises a base material such as epoxy resin; a curing agent such as a thermal curing agent, a photoinitiator, etc.; a coupling agent; and etc. All these above-mentioned materials are transparent materials, thus the cured sealant is also transparent and cannot prevent the light emitted from the backlight module from passing through such that light leakage would take place on the edges of the display apparatus.

SUMMARY

An embodiment of the present disclosure provides a sealant comprising a viscous transparent base material and an electrochromic material doped in the base material. Molecules in the electrochromic material are mutually linked to form a conductive chain and can change color in the case where an electric field is applied upon the electrochromic material, to prevent light from passing through.

An embodiment of the present disclosure provides a display apparatus comprising: an array substrate and a color filter substrate which are disposed oppositely; a shading device and the sealant as mentioned above is arranged on the array substrate at a sealant zone. The color filter substrate is transparent at the sealant zone, and the sealant is configured to adhere the array substrate with the color filter substrate at the sealant zone.

Furthermore, another embodiment of the present disclosure provides a method for preparing the sealant as mentioned above. The method comprises doping the electrochromic material into the base material by stirring.

Furthermore, another embodiment of the present disclosure provides a method for curing the sealant. The method comprises: irradiating the sealant zone of the color filter substrate by UV light such that the UV light passes through the sealant zone of the color filter substrate to cure the sealant. The sealant zone of the color filter substrate may be UV transparent.

BRIEF DESCRIPTION OF THE DRAWINGS

In order to illustrate the technical solutions of the embodiments of the present disclosure more clearly, the figures of the embodiments are briefly described below. Apparently, the figures described below merely relate to some embodiments of the present disclosure rather than are limitative of the present disclosure.

REFERENCE SIGNS

Figure 1:
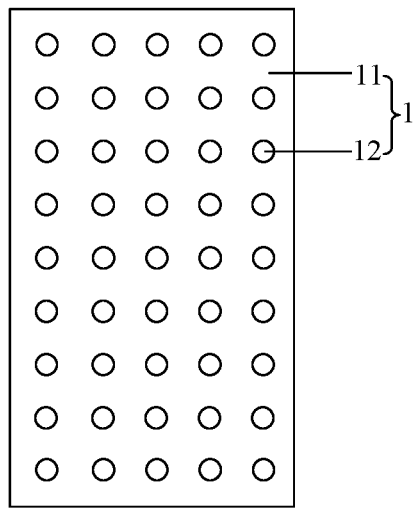
FIG. 1 is a structural schematic view of a sealant in an embodiment of the present disclosure.

1—sealant; 11—material;
12—electrochromic material; 2—substrate;
21—shading device; 3—color filter substrate;
31—black matrix; 4—electrode.

DETAILED DESCRIPTION

To make the object, technical solutions, and advantages of the embodiments of the present disclosure clearer, the technical solutions of the embodiments of the present disclosure will be described below in a clearer and more complete way with reference to the figures of the embodiments of the present disclosure. Apparently, the embodiments described are only part, rather than all of the embodiments of the present disclosure. Based on the embodiments of the present disclosure described, all the other embodiments obtained by a person of ordinary skills in the art without paying inventive work fall into the scope of protection of the present disclosure.

Embodiments of the present disclosure provide a sealant, a preparation method thereof, a curing method, and a display apparatus, which are used for reducing the light leakage on the edges of the display apparatus.

The sealant provided by an embodiment of the present disclosure adopts the following technical solutions.

A sealant comprises a viscous transparent base material and an electrochromic material doped in the base material. Molecules in the electrochromic material are mutually linked to form a conductive chain and the electrochromic material can change color to prevent light from passing through in the case where an electric field is applied.

An embodiment of the present disclosure provides a sealant, which comprises a viscous transparent base material and an electrochromic material doped in the base material. Because molecules in the electrochromic material are mutually linked to form a conductive chain and can change color in the case where an electric field is applied upon the electrochromic material, to prevent light from passing through, the light transmittance of the sealant is reduced, thereby preventing the light from passing through and reducing the light leakage on the edges of the display apparatus.

Furthermore, for achieving a slim frame, an embodiment of the present disclosure provides a display apparatus which adopts the following technical solutions.

A display apparatus comprises: an array substrate and a color filter substrate which are disposed oppositely, a shading device and the sealant as mentioned above being arranged on the sealant zone of the array substrate. The sealant zone of the color filter substrate is transparent, and the sealant is configured to adhere the sealant zone of the array substrate with that of the color filter substrate.

An embodiment of the present disclosure provides a display apparatus. Because the sealant zone of the color filter substrate is transparent, UV light irradiating on the sealant zone of the color filter substrate can pass through it to cure the sealant, thereby facilitating the achievement of a slim frame design of the display apparatus without taking into account the light transmittance of the shading device. Furthermore, molecules in the electrochromic material in the sealant are mutually linked to form a conductive chain and can change color in the case where an electric field is applied upon the electrochromic material, to prevent light from passing through, the light transmittance of the sealant is reduced, thereby preventing the light irradiating on the sealant from passing through. Therefore, even if the sealant zone of the color filter substrate is transparent, no light would be emitted from the sealant zone of the color filter substrate, thereby reducing the light leakage on the edges of the display apparatus.

Furthermore, another embodiment of the present disclosure provides a method for preparing the sealant as mentioned above. The method comprises doping the electrochromic material into the base material by stirring.

The method for preparing the sealant provided by the embodiment of the present disclosure has the same beneficial effects, which are not redundantly described herein, as those of the sealant as mentioned above.

Furthermore, another embodiment of the present disclosure provides a method for curing the sealant. The method comprises: irradiating the sealant zone of the color filter substrate by UV light such that the UV light passes through the sealant zone of the color filter substrate to cure the sealant. The sealant zone of the color filter substrate may be UV transparent.

An embodiment of the present disclosure provides a method for curing the sealant as mentioned above. The sealant can be cured by merely irradiating the sealant zone of the color filter substrate by UV light such that the UV light passes through the sealant zone of the color filter substrate, thereby facilitating the achievement of a slim frame design of the display apparatus without taking into account the light transmittance of the shading device. Furthermore, the electrochromic material in the sealant are mutually linked to form a conductive chain and can change color in the case where an electric field is applied upon the electrochromic material, to prevent light from passing through such that the light transmittance of the sealant is reduced, thereby preventing the light irradiating on the sealant from passing through. Therefore, even if the sealant zone of the color filter substrate is transparent, no light would be emitted from the sealant zone of the color filter substrate, thereby reducing the light leakage on the edges of the display apparatus.

Embodiment 1

This embodiment of the present disclosure provides a sealant. As shown in FIG. 1, the sealant 1 comprises a viscous transparent base material 11 and an electrochromic material 12 doped in the base material 11. Molecules in the electrochromic material 12 are mutually linked to form a conductive chain and can change color in the case where an electric field is applied upon the electrochromic material, to prevent light from passing through.

The principles of the color change of the sealant 1 and the electrochromic material 12 therein are shown as follows:

The inventors of the present application have found that the density of the electrochromic material 12 in the sealant is increased as the mass ratio of the electrochromic material 12 to the base material 11 in the sealant 1 is increased, thereby increasing the probability of forming a conductive chain between molecules of the electrochromic material. That is, the electric conductivity of the sealant 1 is increased as the mass ratio of the electrochromic material 12 to the base material 11 is increased. When the mass ratio of the electrochromic material 12 to the base material 11 has achieved a certain value, a complete conductive chain may be formed in the sealant 1 such that electric charges can be transported between the conductive electrochromic material 12 to change color of the electrochromic material 12 in the case where an electric field is applied.

Because the electrochromic material 12 are uniformly mixed in the base material 11 of the sealant 1, molecules in the electrochromic material 12 are mutually linked to form a fibrous thin film distributed uniformly in the sealant 1. Therefore, when the color of the electrochromic material 12 is changed upon an electric field is applied upon the electrochromic material, the sealant 1 can also present a black color to prevent the light from passing through.

It needs to be noted that the above-mentioned "prevent the light from passing through" means that the light is completely avoided from passing through or a small percent of the light is allowed to pass through it (i.e., preventing most of the light from passing through). Exemplarily, when molecules in the electrochromic material 12 in the sealant 1 are mutually linked to form a fibrous thin film, the color of the electrochromic material 12 is changed upon an electric field is applied such that the sealant 1 may also present a black color. When molecules in the electrochromic material 12 in the sealant 1 are mutually linked but not to form a fibrous thin film, the color of the electrochromic material 12 is changed upon an electric field is applied to reduce the light transmittance of the sealant 1. Exemplarily, the light transmittance of the electrochromic material is reduced to 20% or less.

Furthermore, the base material 11 in the sealant 1 of this embodiment of the present disclosure comprises: a base resin such as epoxy resin; a curing agent such as a thermal curing agent, a photoinitiator, etc.; a coupling agent; and etc. The electrochromic material 12 is polyaniline doped with organic proton acid or viologen doped with organic proton acid.

Polyaniline doped with organic proton acid can change from transparent to black under an electric voltage of 1V, thereby reducing the light transmittance of the sealant 1 to a very low level, while viologen having a shorter alkyl substituent group can change from transparent to blue black under an electric voltage of 2V, thereby reducing the light transmittance of the sealant 1 to 20% or less. Therefore, polyaniline doped with organic proton acid is for example used as the electrochromic material 12 in the embodiment of the present disclosure to achieve an optimized light blocking effect after the sealant has changed color.

Furthermore, the organic proton acid in the embodiment of the present disclosure may be methylsulfonic acid, camphosulfonic acid, dodecylbenzenesulfonic acid, benzenephosphoric acid or benzoic acid. Methylsulfonic acid has a smaller molecular volume and thus can diffuse into polyaniline or viologen more easily and has a better doping effect.

Therefore, in some embodiments, the organic proton acid comprises methylsulfonic acid, such as, the organic proton acid is methylsulfonic acid. The electrochromic material 12 comprises polyaniline doped with methylsulfonic acid, such as, the electrochromic material 12 is polyaniline doped with methylsulfonic acid.

Specifically, in the case where the electrochromic material 12 is polyaniline doped with methylsulfonic acid, the electrochromic process of the electrochromic material 12 is as follows:

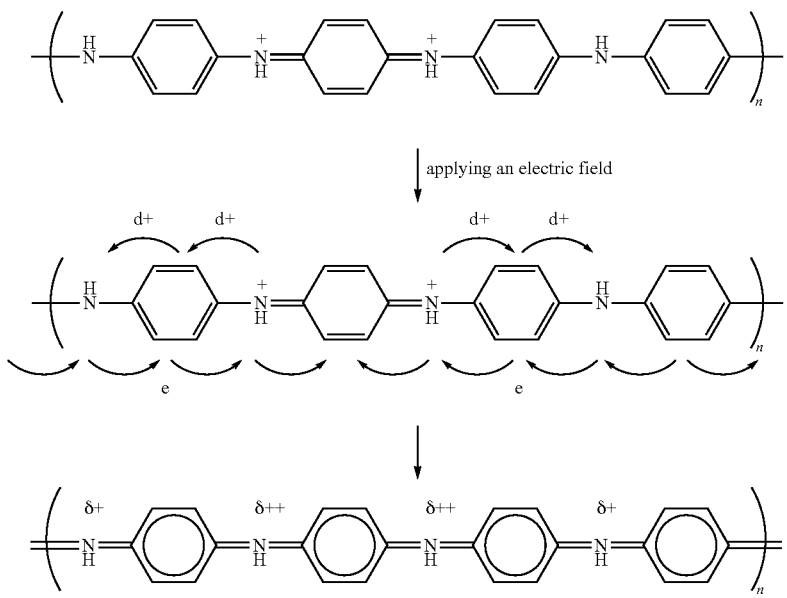

Furthermore, as known from the aforementioned description with regard to the principles of color change of the sealant 1 and the electrochromic material 12 therein, the electric conductivity of the sealant 1 is increased as the mass ratio of the electrochromic material 12 to the base material 11 is increased. However, the inventors of the present disclosure have found that in the case where the mass ratio of the electrochromic material 12 to the base material 11 exceeds 15%, the increase of the electric conductivity of the sealant 1 would be not yet significant because a complete conductive chain has been formed in the sealant 1. Therefore, the mass ratio of the electrochromic material 12 to the base material 11 in the sealant 1 is for example 10%-15% in the embodiment of the present disclosure such that a complete conductive chain is formed in the sealant 1 and the electrochromic material 12 can be uniformly missed in the base material 1 easily.

The embodiment of the present disclosure provides a sealant, The sealant comprises a viscous transparent base material and an electrochromic material doped in the base material. The electrochromic material change color in the case where an electric field is applied upon the electrochromic material, to prevent light from passing through, thereby reducing the light transmittance of the sealant and further preventing the light irradiating on the sealant from passing through such that the light leakage can be reduced on the edges of the display apparatus.

Embodiment 2

Figure 2:
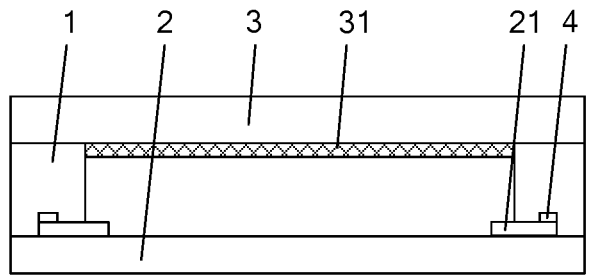
FIG. 2 is a structural schematic view of a display apparatus in an embodiment of the present disclosure.

An embodiment of the present disclosure provides a display apparatus. As shown in FIG. 2, the display apparatus comprises: an array substrate 2 and a color filter substrate 3 which are disposed oppositely, a shading device 21 being arranged on the sealant zone of the array substrate 2; and the sealant 1 as mentioned in Embodiment 1. The sealant zone of the color filter substrate 3 is transparent, that is, any shading black matrix is not arranged on the sealant zone of the color filter substrate 3 and a shading black matrix 31 is arranged on the display zone of the color filter substrate; wherein, the sealant 1 is used to adhere the sealant zone of the array substrate 2 with that of the color filter substrate 3.

Exemplarily, the shading device 21 is a gate drive circuit. In the display apparatus without the sealant according to the present disclosure, after a sealant has been coated on the location region of the gate drive circuit, it is required to irradiate the sealant by UV light from the side of the array substrate to cure the sealant. Therefore, a relative high light transmittance is required on the location region of the gate drive circuit; and all components and wires in the gate drive circuit are also required to be opaque. Therefore, it is required to reserve a space where any component or wire is not arranged and which is used merely for light transmission, on the location region of the gate drive circuit, thereby resulting in a relative large area of the location region of the gate drive circuit; and further resulting in a relative large area of the surrounding region of the array substrate which is disadvantageous to a slim frame design of the display apparatus.

However, the sealant zone of the color filter substrate 3 is transparent in the embodiment of the present disclosure such that the sealant zone of the color filter substrate 3 can be irradiated by UV light which can pass through the sealant zone of the color filter substrate 3 to cure the sealant 1, thereby facilitating the achievement of a slim frame design of the display apparatus without taking into account the light transmittance of the shading device 21. Furthermore, The display apparatus comprises the same sealant 1 as the sealant 1 in Embodiment 1 such that the sealant 1 can prevent the light from passing through; therefore, even if the sealant zone of the color filter substrate 3 is transparent, no light would be emitted from the sealant zone of the color filter substrate 3, thereby reducing the light leakage on the edges of the display apparatus.

Furthermore, for facilitating the electrochromic material 12 in the sealant 1 to change color during the use of the display apparatus, the display apparatus in the embodiment of the present disclosure further comprises an electrode 4 which are electrically connected with the electrochromic material 12 in the sealant 1. For the principle of the color change of the electrochromic material 12, reference is made to the corresponding description in Embodiment 1, which is not redundantly described in this embodiment of the present disclosure.

Furthermore, the shading device 21 in the embodiment of the present disclosure is a gate drive circuit. The gate drive circuit comprises an initial signal line which is a signal line for controlling the start of one-frame scan in the gate drive circuit and is also known as STV signal line. The electrode 4 is connected in parallel with the initial signal line such that the initial signal line and the electrode 4 can be simultaneously controlled by a single electric signal, thus the drive of the electrode 4 can be achieved with no requirement of arranging an individual drive circuit for the electrode 4 such that the drive method and drive circuit of the display apparatus is simplified. Exemplarily, the material of the electrode 4 is indium tin oxide. Specifically, when the gate drive circuit starts to scan, an electric signal is inputted in the initial signal line such that an electric signal is also inputted on the electrode 4, thereby changing the color of the electrochromic material 12 in the sealant 1 and further reducing the light transmittance of the sealant 1, therefore the sealant can block the light irradiating on the sealant.

Exemplarily, when the electrochromic material 12 is polyaniline doped with methylsulfonic acid, the polyaniline doped with methylsulfonic acid has a very quick electrochromic response speed of microsecond level and the color change can continue for a period of time, thus whenever an electric signal is inputted on the initial signal line, the electrochromic material 12 in the sealant 1 can change color such that the sealant 1 can continuously present a black color to block the light emitted towards it.

Additionally, the base material 11 in the sealant 1 in Embodiment 1 comprises base resin and the electrochromic material 12 is polyaniline doped with methylsulfonic acid, thus the sealant 1 can have an excellent anticorrosion and antistatic effect for the metal wires of the gate drive circuit which is covered by the sealant 1.

In order that a person skilled in the art may clearly recognize the advantages of the display apparatus in the embodiment of the present disclosure in slim frame designs, hereinafter, the widths of the frames which can be achieved in the display apparatus without the sealant according to the present disclosure and the display apparatus in the embodiment of the present disclosure are compared in the embodiment of the present disclosure.

It needs to be noted that each of the two display apparatuses comprises an array substrate which is prepared by the production process of 6-masks (that is a mask for forming a via hole on the gate insulation layer is omitted, and the jumper line in the gate drive circuit may be achieved merely by using the via hole on the passivation layer). Furthermore, the gate drive circuit on the array substrate adopts a circuit structure of 10T1C with a clock signal of 8 phases. Each of the two display apparatuses is a display apparatus cut along the edges of the sealant, and a common electrode wire, a gate drive circuit and a signal line are arranged between the display zone and the cutting edge of the array substrate in sequence; and the distance between the common electrode wire and the gate drive circuit, the distance between the gate drive circuit and the signal line and the distance between the signal line and the cutting edge are the same.

For the display apparatus without the sealant according to the present disclosure, the location region of the gate drive circuit is required to have a light transmittance of 30% in order to cure the sealant. In this case, the width of the narrowest frame of the display apparatus is 0.92 mm, wherein the width of the common electrode wire is 50 μm; the total width of the location region of the gate drive circuit and the signal line is 750 μm; and the distance between the signal line and the cutting edge is 120 μm.

For the display apparatus in the embodiment of the present disclosure, the location region of the gate drive circuit is not required to taken into consideration. In this case, the width of location region of the gate drive circuit and the signal line may be reduced to 600 μm, thus the narrowest frame of the display apparatus is 0.77 mm, wherein the width of the common electrode wire is 50 μm; the total width of the location region of the gate drive circuit and the signal line is 600 μm; and the distance between the signal line and the cutting edge is 120 μm.

As known from the above comparison, in the display apparatus provided in the embodiment of the present disclosure, the sealant zone of the color filter substrate is transparent, thus UV light irradiating on the sealant zone of the color filter substrate can pass through it to cure the sealant, thereby facilitating the achievement of a slim frame design of the display apparatus without taking into account the light transmittance of the shading device. Furthermore, molecules in the electrochromic material in the sealant are mutually linked to form a conductive chain and can change color in the case where an electric field is applied upon the electrochromic material, to prevent light from passing through, such that the light transmittance of the sealant is reduced, thereby preventing the light irradiating on the sealant from passing through. Therefore, even if the sealant zone of the color filter substrate is transparent, no light would be emitted from the sealant zone of the color filter substrate, thereby reducing the light leakage on the edges of the display apparatus.

Embodiment 3

An embodiment of the present disclosure provides a preparation method of the sealant as stated in Embodiment 1. The preparation method comprises: doping the electrochromic material into the base material by stirring.

Figure 3:
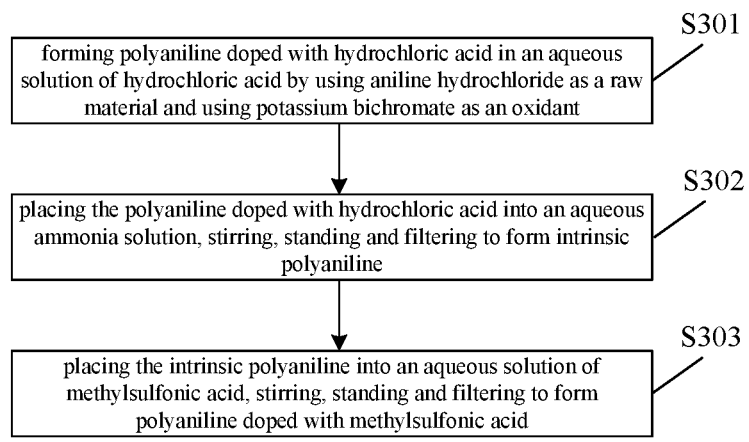
FIG. 3 is a flow chart of a preparation method of an electrochromic material in a sealant in an embodiment of the present disclosure.

Furthermore, the preparation method further comprises the step of preparing the electrochromic material. Different electrochromic materials have different preparation methods; and a specific electrochromic material may also have a plurality of preparation methods. Exemplarily, when the electrochromic material is polyaniline doped with methylsulfonic acid, as shown in FIG. 3, the step for preparing the electrochromic material specifically comprise steps S301 to S303.

Step S301: forming polyaniline doped with hydrochloric acid in an aqueous solution of hydrochloric acid by using aniline hydrochloride as a raw material and using potassium bichromate as an oxidant.

Step S302: placing the polyaniline doped with hydrochloric acid into an aqueous ammonia solution, stirring, standing and filtering to form intrinsic polyaniline. Exemplarily, the aqueous ammonia solution has a concentration of 2 mol/L.

Step S303: placing the intrinsic polyaniline into an aqueous solution of methylsulfonic acid, stirring, standing and filtering to form polyaniline doped with methylsulfonic acid. Exemplarily, the aqueous solution of methylsulfonic acid has a concentration of 2 mol/L.

Specifically, forming polyaniline doped with methylsulfonic acid from the intrinsic polyaniline is as follows:

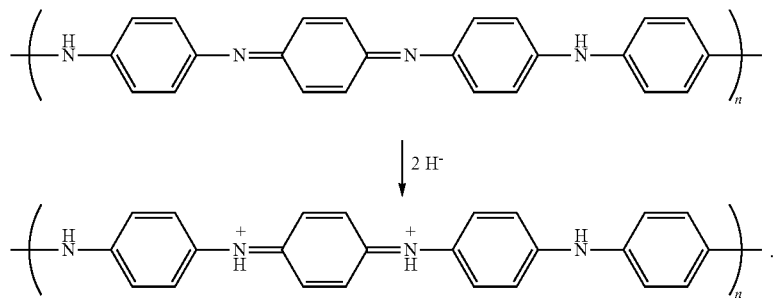

After the electrochromic material has been prepared by using the above-mentioned steps, the step of doping the electrochromic material into the base material by stirring specifically comprises:

mixing a solution of polyaniline doped with methylsulfonic acid with a solution of base material and stirring to mix the solutions uniformly. Exemplarily, the solution of polyaniline doped with methylsulfonic acid is mixed with the base material at a mass ratio (polyaniline doped with methylsulfonic acid to the base material) of 10%-15% and stirred uniformly for 3-4 hours to mix the solutions uniformly.

The present disclosure provides a preparation method of a sealant. The preparation method of a sealant comprises doping the electrochromic material into the base material by stirring. Because molecules in the electrochromic material in the sealant are mutually linked to form a conductive chain and can change color in the case where an electric field is applied upon the electrochromic material, to prevent light from passing through such that the light transmittance of the sealant is reduced, thereby preventing the light irradiating on the sealant from passing through and reducing the light leakage on the edges of the display apparatus.

Embodiment 4

An embodiment of the present disclosure provides curing method of the sealant comprised by the display apparatus in Embodiment 2. The curing method comprises irradiating the sealant zone of the color filter substrate by UV light such that the UV light passes through the sealant zone of the color filter substrate to cure the sealant. Therefore, a slim frame design of the display apparatus is facilitated to be achieved without taking into account the light transmittance of the shading device. Furthermore, molecules in the electrochromic material in the sealant are mutually linked to form a conductive chain and can change color in the case where an electric field is applied upon the electrochromic material, to prevent light from passing through such that the light transmittance of the sealant is reduced, thereby preventing the light irradiating on the sealant from passing through.

Therefore, even if the sealant zone of the color filter substrate is transparent, no light would be emitted from the sealant zone of the color filter substrate, thereby reducing the light leakage on the edges of the display apparatus.

The above description is merely exemplary embodiments which are not used for limiting the scope of protection of the present disclosure which is, however, determined by the attached claims.

The present application claims the priority of the Chinese Patent Application No. 201510181197.8 submitted on Apr. 16, 2015, and the content disclosed in the above Chinese patent application is incorporated by reference as part of this application.

What is claimed is:

1. A sealant comprising a viscous transparent base material and an electrochromic material doped in the base material, molecules in the electrochromic material being mutually linked to form a conductive chain to allow the electrochromic material to be capable of changing color in a case where an electric field is applied upon the electrochromic material, to prevent light from passing through.

2. The sealant as defined according to claim 1, wherein the electrochromic material comprises at least one selected from the group consisting of: polyaniline doped with organic proton acid, viologen doped with organic proton acid, and a combination thereof.

3. The sealant as defined according to claim 2, wherein the organic proton acid comprises at least one selected from the group consisting of: methylsulfonic acid, camphosulfonic acid, dodecylbenzenesulfonic acid, benzenephosphoric acid, benzoic acid and a combination thereof.

4. The sealant as defined according to claim 3, wherein the organic proton acid comprises methylsulfonic acid, and the electrochromic material comprises polyaniline doped with methylsulfonic acid.

5. The sealant as defined according to claim 4, wherein an electrochromic process of the electrochromic material is as follows:

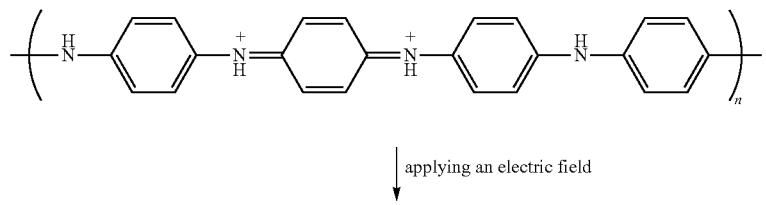

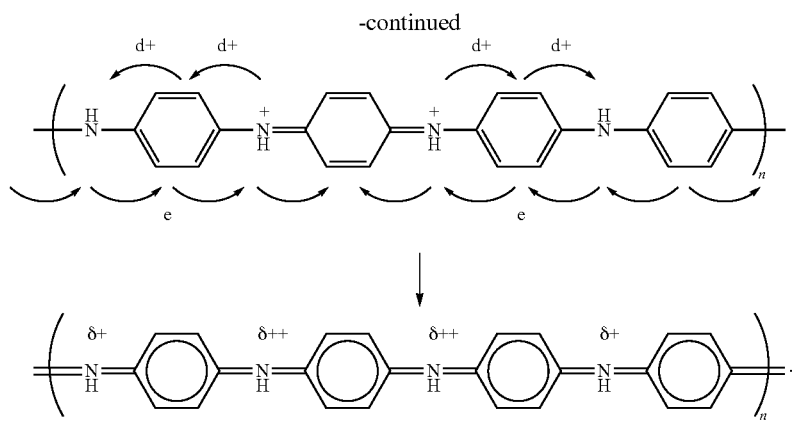

6. The sealant as defined according to claim 1, wherein a mass ratio of the electrochromic material to the base material is in a range of from 10% to 15%.

7. A display apparatus comprising: an array substrate and a color filter substrate which are disposed oppositely,
wherein: a shading device and the sealant as defined according to claim 1 are arranged on the array substrate at a sealant zone; the color filter substrate is transparent at the sealant zone; and the sealant is configured to adhere the array substrate with the color filter substrate at the sealant zone.

8. The display apparatus as defined according to claim 7, further comprising an electrode which is electrically connected with the electrochromic material in the sealant.

9. The display apparatus as defined according to claim 8, wherein; the shading device is a gate drive circuit; the gate drive circuit comprises an initial signal line; and the electrode is connected in parallel with the initial signal line.

10. The display apparatus as defined according to claim 7, wherein the electrochromic material comprises at least one selected from the group consisting of: polyaniline doped with organic proton acid, viologen doped with organic proton acid, and a combination thereof.

11. The display apparatus as defined according to claim 10, wherein the organic proton acid comprises at least one selected from the group consisting of: methylsulfonic acid, camphosulfonic acid, dodecylbenzenesulfonic acid, benzenephosphoric acid, benzoic acid and a combination thereof.

12. The display apparatus as defined according to claim 11, wherein: the organic proton acid comprises methylsulfonic acid, and the electrochromic material comprises polyaniline doped with methylsulfonic acid.

13. The display apparatus as defined according to claim 7, wherein a mass ratio of the electrochromic material to the base material is in the range of from 10% to 15%.

14. A method for curing the sealant in the display apparatus as defined according to claim 7, comprising:
irradiating the sealant zone of the color filter substrate by UV light such that the UV light passes through the sealant zone of the color filter substrate to cure the sealant.

15. A method for preparing the sealant as defined according to claim 1, comprising: doping the electrochromic material into the base material by stirring.

16. The method as defined according to claim 15, wherein the electrochromic material is polyaniline doped with methylsulfonic acid.

17. The method as defined according to claim 16, further comprising:
forming polyaniline doped with hydrochloric acid in an aqueous solution of hydrochloric acid by using aniline hydrochloride as a raw material and using potassium bichromate as an oxidant;
placing the polyaniline doped with hydrochloric acid into an aqueous ammonia solution, stirring, standing and filtering to form intrinsic polyaniline; and
placing the intrinsic polyaniline into an aqueous solution of methylsulfonic acid, stirring, standing and filtering to form polyaniline doped with methylsulfonic acid.

18. The method as defined according to claim 16, wherein a solution of polyaniline doped with methylsulfonic acid is mixed with a solution of base material by stirring to have the solutions mixed uniformly.

* * * * *